United States Patent Office 2,723,155
Patented Nov. 8, 1955

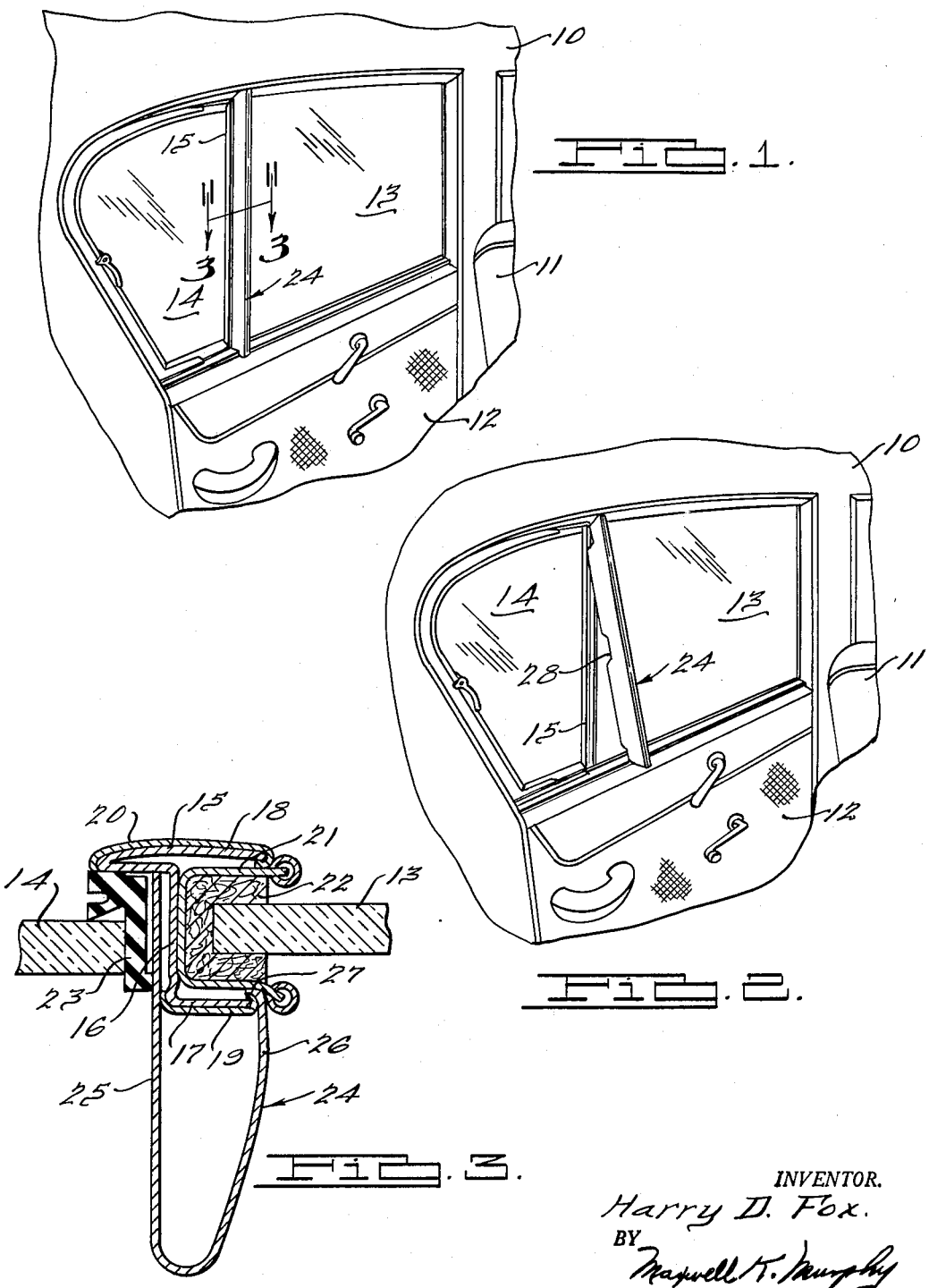

2,723,155

DRAFT DEFLECTOR

Harry D. Fox, Williamsburg, Mich., assignor to F. L. Jacobs Co., Detroit, Mich., a corporation of Michigan Application September 11, 1952, Serial No. 309,036

1 Claim. (Cl. 296—44)

This invention relates to draft deflectors for vehicle bodies, particularly those bodies wherein the ventilation system includes a window opening having a pair of closures consisting of a sliding panel and an adjacent swinging panel, with the latter positioned rearwardly of the sliding panel.

In bodies of this type—usually two-door or four-door sedans—opening of the pivoted vent panel in the rear window opening sometimes induces a draft of air on the neck and shoulders of the front seat passengers which is highly objectionable. Fisher Patent No. 1,996,573, granted April 2, 1935, discusses this matter at some length and discloses a structure for overcoming the objectionable draft.

In the patent mentioned, a bulky post is provided between the sliding and pivoting panels of the window, which post extends a considerable distance outwardly as well as inwardly of the vehicle. The post is constructed of metal stampings and is assembled with screws and is necessarily a permanent, built-in feature of the body.

My improved draft deflector attains substantially the same result as the patented structure, yet consists of a single piece of material of stamped, molded, extruded or other construction and is attached to the window post without fastenings.

The principal object of the invention is to provide an improved draft deflector of simple design.

Another object is to provide a draft deflector that is easily attached to the window post without fastenings whereby the device may be sold as an accessory to be attached by the purchaser.

Other objects and advantages will be apparent from the following description.

In the accompanying drawing, which illustrates a preferred form of the device,

Fig. 1 is a partial perspective view of the interior of an automobile body showing the draft deflector mounted on a left rear door window.

Fig. 2 is a similar view showing the method of mounting the deflector in the window structure, and Fig. 3 is an enlarged sectional view taken as indicated by the arrows 3—3 in Fig. 1.

Referring to the drawing, it will be seen that I have shown an automobile body 10 having a front seat 11 and a rear door 12. The latter has a window opening which may be opened and closed for ventilating purposes by means of a sliding glass panel 13 and a pivotally movable glass panel 14. A post 15 rigidly mounted in the window opening separates the two panels.

As may be more clearly seen from Fig. 3, the post 15 comprises a shaped strip of metal having a central portion 16, an inner leg 17 bent at right angles thereto and an outer reversely bent leg 18 disposed substantially parallel to the leg 17. Decorative mouldings 19 and 20 are secured to the respective legs to enhance the appearance of the post.

A channel member 21 is secured to the post by rivets or spot welds (not shown). This channel has a felt or fibre channel 22 secured therein in which the glass 13 slides. On the opposite side of the post 15, a resilient sealing strip 23 is secured by rivets or other fastening means (not shown). This seal may be of rubber or similar material and is of angle shape such that the pivoted panel 14 when closed engages it along the forward edge thereof to seal the opening. The relationship of these parts will be readily understood from the drawing.

My draft deflector, generally designated by numeral 24, consists of a single piece of material formed into substantially U-shape with one leg thereof elongated. The deflector may be of aluminum, stainless steel or other metal, or it may be of plastic material shaped from sheet or extruded.

In the embodiment shown, the deflector 24 is formed of stainless steel and has a long leg 25 and a short leg 26. The latter terminates in a bent-over portion or hook 27. Cut-outs 28 are provided at top, bottom and in the center of the leg 25 (see Fig. 2) for avoiding the rivets used to fasten the seal 23 to the section 16 of post 15.

The deflector is installed by inserting the top portion of the leg 25 between the seal 23 and the post center section 16 and forcing the deflector downwardly and toward the post with the hand until it is completely inserted along its length. At the same time, the hook portion 27 is inserted behind the turned-over edge of the molding 19 such that when the deflector is in the position shown in Fig. 1, the legs 25 and 26 will engage the post throughout their lengths.

Insertion of the deflector legs as described is relatively easy and requires no tools because the seal 23 will readily "give" to accommodate the leg 25 and the felt material 22 will readily compress to permit bending of the inner leg of the metal channel 21 to accommodate the hook portion 27.

Removal of the deflector, if desired, is accomplished by pulling the leg 25 straight out and then exerting force on the leg 26 in a direction tending to remove the hook portion 27 from its engagement between the post section 17 and the channel 21.

It may thus be seen that my improved deflector is capable of being installed or removed without tools, without skilled workmanship and with no marring of the window post or other parts. The fact that no fastenings of any kind are required makes it possible for the device to be sold as an accessory for installation by the user as well as for original installation at the factory or by a dealer.

I claim:

A draft deflector adapted for installation in a vehicle window opening having a pivoted panel and an adjacent sliding panel for closing said opening and a post separating said panels, said post having mounted thereon a resilient seal adapted to engage one edge of the pivoted panel and a channel member for receiving one edge of the sliding panel, said draft deflector comprising an elongated U-shaped member having a substantially flat longer leg adapted to be inserted between said seal and said post, the inserted portion of said longer leg being substantially coextensive in height and depth with said post, the shorter leg of said U-shaped member being generally parallel to said longer leg and terminating in an edge portion bent toward said longer leg and adapted to be received between said channel member and said post, said shorter leg and said edge portion thereof being coextensive in height with said post.

References Cited in the file of this patent

UNITED STATES PATENTS

| 1,996,573 | Fisher | Apr. 2, 1935 |
| 2,582,914 | Reed | Jan. 15, 1952 |